United States Patent
Shah et al.

(10) Patent No.: US 11,447,185 B2
(45) Date of Patent: Sep. 20, 2022

(54) ENHANCED ENERGY ABSORPTION ROCKER ASSEMBLY

(71) Applicant: GM GLOBAL TECHNOLOGY OPERATIONS LLC, Detroit, MI (US)

(72) Inventors: Bhavesh Shah, Troy, MI (US); Bradley A. Newcomb, Troy, MI (US); Joseph M. Polewarczyk, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/176,712

(22) Filed: Feb. 16, 2021

(65) Prior Publication Data

US 2022/0258805 A1 Aug. 18, 2022

(51) Int. Cl.
*B62D 25/02* (2006.01)
*B62D 21/15* (2006.01)
*B62D 29/00* (2006.01)

(52) U.S. Cl.
CPC ......... *B62D 25/025* (2013.01); *B62D 21/157* (2013.01); *B62D 29/005* (2013.01)

(58) Field of Classification Search
CPC ........................... B62D 25/025; B62D 21/157
USPC .... 296/209, 187.12; 188/371, 374, 376, 377
See application file for complete search history.

(56) References Cited

U.S. PATENT DOCUMENTS

| 6,550,847 B2 * | 4/2003 | Honda | B62D 29/002 296/205 |
| 8,608,232 B2 * | 12/2013 | Engertsberger | B62D 21/157 296/187.12 |
| 2017/0066485 A1 * | 3/2017 | Yamaguchi | B62D 25/2036 |

* cited by examiner

*Primary Examiner* — Dennis H Pedder
(74) *Attorney, Agent, or Firm* — Quinn IP Law

(57) ABSTRACT

A rocker assembly for a vehicle body structure includes a rocker rail having a boxed cross-section defining a rocker rail interior space, a rocker rail length, and a rocker rail outer surface along the length. The rocker rail defines at least one aperture connecting the interior space and the panel outer surface. The rocker assembly also includes an insert member configured to fit within the rocker rail interior space and extend along the panel length to reinforce the panel. The insert member includes at least one projection configured to match up with and extend at least partially through a respective at least one aperture. The projection(s) are configured to reinforce the rocker rail by opposing deformation of the boxed cross-section. The projection(s) oppose deformation via interference with the boxed cross-section at the respective aperture(s) when the rocker rail is subjected to an applied load perpendicular to the panel outer surface.

18 Claims, 3 Drawing Sheets

ENHANCED ENERGY ABSORPTION ROCKER ASSEMBLY

INTRODUCTION

The present disclosure relates to an enhanced energy absorption vehicle rocker assembly.

A motor vehicle typically employs a robust frame for supporting the vehicle's body. The more common types of vehicle frames are a full frame, a unibody, and a sub-frame. A full frame is generally a distinct structure that provides a mounting base for the vehicle body, while a unibody is typically formed by integrating frame sections with the vehicle body.

Motor vehicles frequently employ additional structural components and sections, such as bumpers, buttresses, and other load bearing structures tied to the vehicle frame. Such components are generally designed to allow the vehicle to withstand some level of applied force without sustaining extensive damage to the vehicle's body structure and various onboard systems. Typically, a significant portion of applied energy is routed by structural components to the vehicle frame, thereby allowing the frame to absorb the applied force.

Motor vehicles generally also include one or more side doors to open and close off entry into the vehicle. The body section below the base of the door openings is generally called a "rocker rail" or a "sill". Rocker rails are generally structural sections designed to reinforce the door opening. The rocker rail may be designed such that the body structure may withstand some level of applied force, permit the door opening to retain its shape, and route the applied energy away from the vehicle's passenger compartment.

SUMMARY

A rocker assembly for a vehicle body structure includes a rocker rail having a boxed cross-section defining a rocker rail interior space, a rocker rail length, and a rocker rail outer surface along the rocker rail length. The rocker rail defines at least one aperture connecting the interior space and the rocker rail outer surface. The rocker assembly also includes an insert member configured to fit within the rocker rail interior space and extend along the rocker rail length to reinforce the panel. The insert member includes at least one projection configured to match up with and extend at least partially through a respective at least one aperture. The at least one projection includes a contour configured to reinforce the rocker rail. The projection contour is configured to reinforce the rocker rail by opposing deformation of the boxed cross-section. The projection(s) oppose deformation via interference with the boxed cross-section at the respective aperture(s) when the rocker rail is subjected to an applied load perpendicular to the rocker rail outer surface.

The rocker rail may include a plurality of apertures. In such an embodiment, at least two of the plurality of apertures may have dissimilar shapes.

In an embodiment where the rocker rail includes a plurality of apertures, the apertures may be arranged in a straight line across the rocker rail length.

In an embodiment where the rocker rail includes a plurality of apertures, the apertures may be arranged in a staggered pattern across the rocker rail length.

The insert member may include an adhesive backing configured to adhere the insert member to the rocker rail within the interior space.

The contour of the projection(s) may have a gradually increasing cross-section viewed from the rocker rail outer surface into the rocker rail interior space, such as a conical shape in a plane perpendicular to the rocker rail outer surface. The gradually increasing cross-section of the projection(s) is intended to oppose deformation of the boxed cross-section via progressively increasing interference with the boxed cross-section at the respective at least one aperture when the rocker rail is subjected to the applied load.

The rocker rail may include a first C-channel arranged along the rocker rail length within the rocker rail interior space and against a boxed cross-section wall arranged opposite the at least one aperture. In such an embodiment, the first C-channel may be configured to hold the insert member within the rocker rail interior space.

The rocker assembly may additionally include a metal plate configured to extend within the rocker rail interior space along the rocker rail length and support the insert member within the rocker rail interior space. Furthermore, the rocker rail may include a second C-channel arranged along the rocker rail length within the rocker rail interior space and between the boxed cross-section wall arranged opposite the at least one aperture and the at least one aperture. In such an embodiment, the second C-channel may be configured to hold the metal plate.

The insert member may be constructed from a polymer material. Alternatively, the insert member is constructed from a composite material.

A vehicle body structure having a body panel that defines a door opening and having a frame rail may also include the above-disclosed rocker assembly arranged proximate the door opening and structurally connected to the frame rail.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
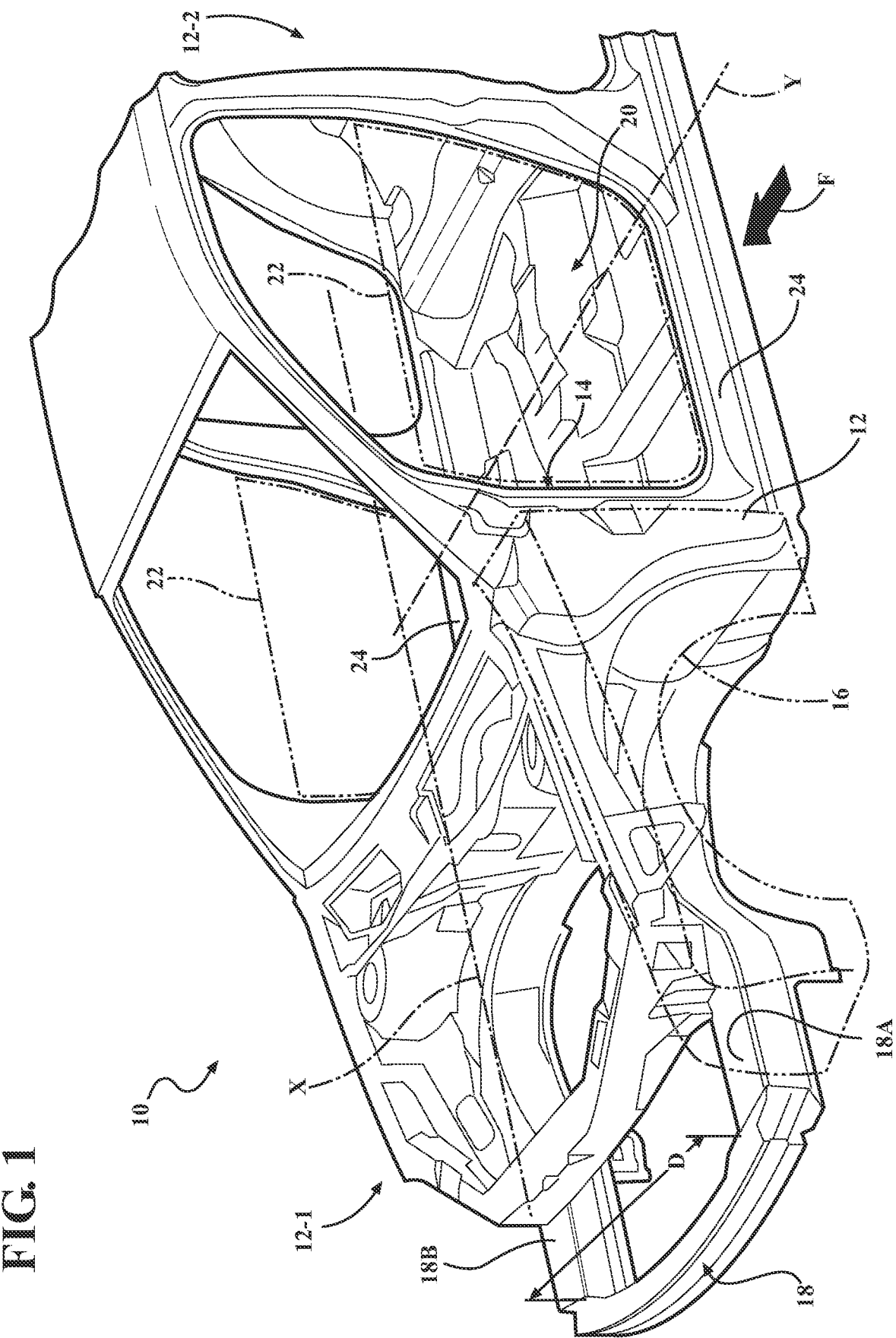
FIG. 1 is a schematic perspective partial view of a vehicle body structure having a body panel that defines a door opening and a rocker assembly, according to the present disclosure.

Referring to the drawings, wherein like reference numbers refer to like components, FIG. 1 shows a perspective schematic outline of a vehicle 10 having a vehicle body structure 12 having a front section 12-1 and a rear section 12-2. The vehicle body structure 12 is made up of a vehicle body 14 constructed from a number of components, such as exterior body panels 16, sub-structures, and a frame 18. The vehicle body 14 is characterized by a longitudinal vehicle centerline that generally coincides with an X-axis and is orthogonal to a Y-axis (shown in FIG. 1). The vehicle body 14 is attached to the frame 18, thus enabling a support structure for a vehicle suspension and wheels, while also supporting vehicle subsystems, such as a steering system, a powertrain, passengers, and cargo (not shown). As shown, the frame 18 is arranged in the general plane of the vehicle 10, substantially defined by the X and Y axes. As shown, the frame 18 includes two frame rails, 18A and 18B, separated in the vehicle body structure 12 by a distance D.

The frame rails 18A and 18B may be substantially parallel with respect to each other, e.g., within +/−5° of true parallel. As shown, the frame rails 18A, 18B may be configured as full-length rails that include the dashed line sections, and thereby, along with the body 14, define a body-on-frame body structure. Alternatively, the frame rails 18A, 18B may be configured as partial rails that exclude the dashed line sections, which together with the body 14 define an integral body and frame structure. Such an integral vehicle body structure 12 lacks a separate load-carrying internal frame, and may have either a "unibody" or a "semi-monocoque" construction, as identified in the art. In the unibody construction, the frame, the floor plan, and the chassis are typically combined into a single structure which uses box sections, bulkheads, and tubes to provide most of the strength of the vehicle body, while exterior body panels add relatively little strength or stiffness. Similar to the unibody structure, a semi-monocoque construction is an integrated structure that employs ribs, bulkheads, and box sections to reinforce the vehicle body, while the outer body panels bear a smaller portion of the structural load.

The first and second frame rails 18A, 18B are arranged substantially symmetrically with respect to the X-axis or the longitudinal vehicle centerline. Frame rails 18A and 18B may be constructed from aluminum, and be formed by one or more appropriate methods, such as extrusion, hydroforming, roll-forming, stamping, and welding. The exterior body panels 16 include left and right side body panels, which may define respective door openings 20, as shown in FIG. 1. In such an embodiment, the subject body panel 16 is configured to mount a door 22 within the door opening 20 for controlling entry into the vehicle 10. As shown, the vehicle body structure 12 also includes a rocker assembly 24 arranged proximate to each door opening 20 and structurally connected with a respective frame rail 18A or 18B. Accordingly, the first and second frame rails 18A, 18B, respective body panels 16, and rocker assemblies 24 may be part of a unibody or semi-monocoque structure in a generally light-duty passenger vehicle, or part of the body-on-frame structure in a heavier duty vehicle, such as a truck.

Figure 2:
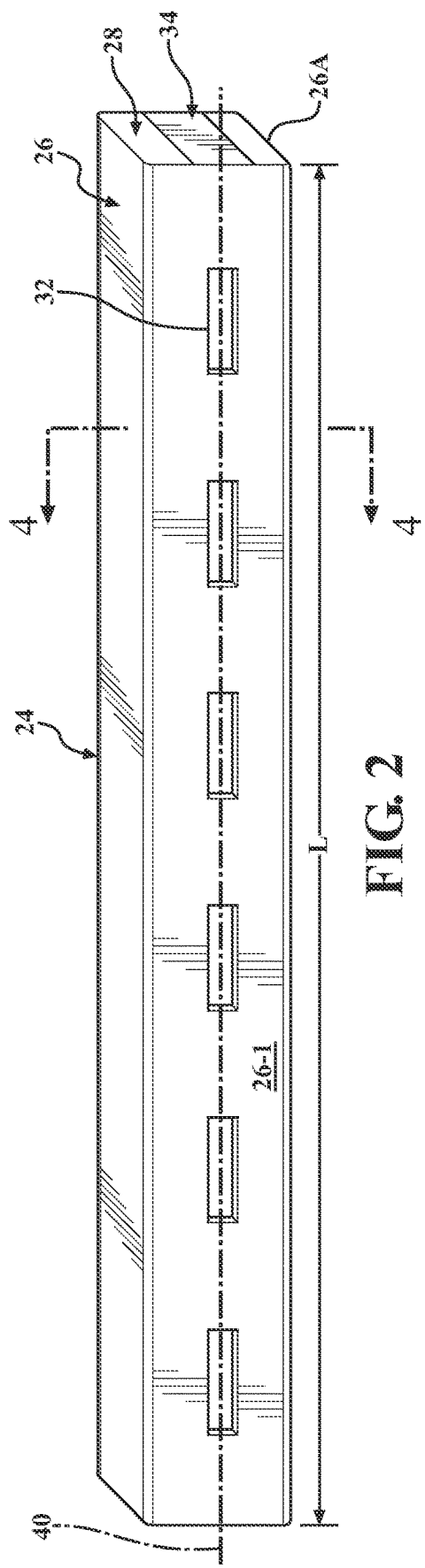
FIG. 2 is a schematic close-up perspective view of the rocker assembly shown in FIG. 1, illustrating one embodiment of the rocker assembly having a rocker rail with apertures and an insert member arranged therein, according to the disclosure.
Figure 4:
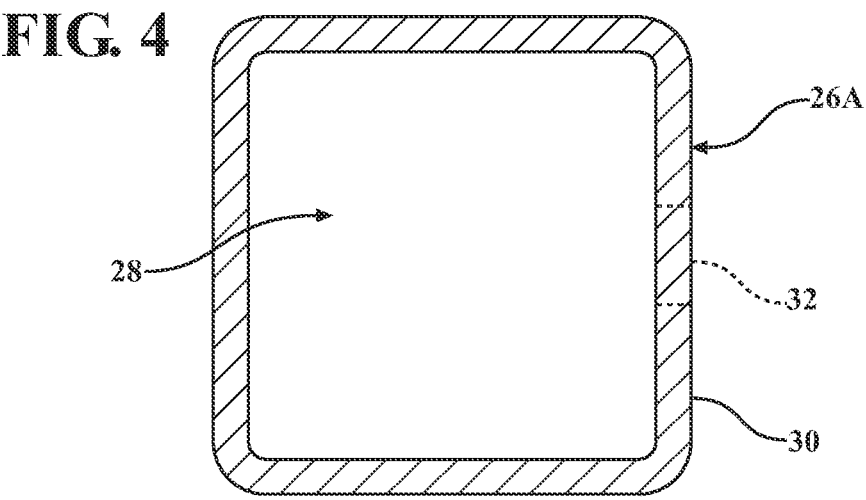
FIG. 4 is a schematic cross-sectional side view of the rocker rail having a boxed cross-section indicated in FIG. 2, according to one separate embodiment.
Figure 5:
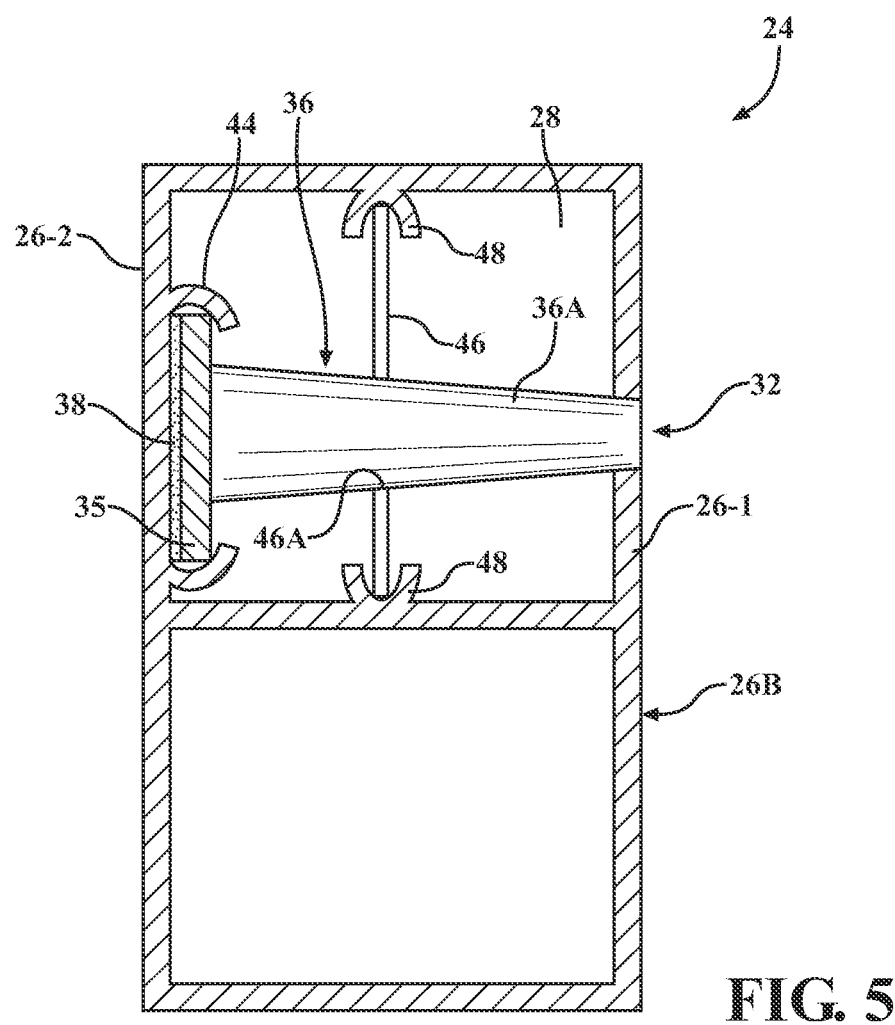
FIG. 5 is a schematic cross-sectional side view of the rocker rail with the insert member having a projection matched up with an aperture in the rocker rail, according to another embodiment.

As shown in FIG. 2, each rocker assembly 24 includes a rocker rail 26. The rocker rail 26 has a boxed cross-section 26A (indicated in FIG. 2 and shown in FIG. 4) defining a rocker rail interior space 28, a rocker rail length L, and a rocker rail outer surface or face 30 along the rocker rail length. With respect to the rocker rail 26, the boxed cross-section 26A denotes the rocker rail having a fully enclosed, quadrilateral shaped cross-section at one or more points along the rocker rail length L. Furthermore, as shown, the boxed cross-section 26A may have a substantially uniform shape along the rocker rail length L. The boxed cross-section 26A may have a single tier structure, as shown in FIG. 4, or a multi-tiered or compartmentalized structure 26B, as shown in FIG. 5. Either the single boxed cross-section 26A or the multi-tiered boxed cross-section 26B may be optimized using finite element analysis (FEA).

The rocker rail 26 also defines at least one aperture 32 connecting the interior space 28 and the rocker rail outer surface 30. As shown in FIG. 5, the aperture(s) 32 extend through one side, indicated via numeral 26-1, of the boxed cross-section 26A and are arranged along the rocker rail length L. The side positioned opposite the side 26-1 is indicated via numeral 26-2. The rocker assembly 24 also includes an insert member 34 (shown in FIGS. 2-3). The insert member 34 is configured to fit, i.e., be positioned, within the rocker rail interior space 28 and extend along the rocker rail length L to reinforce the rocker rail 26. The insert member 34 may be constructed from various formable materials, such as an aluminum alloy or a polymer. Alternatively, the insert member 34 may be constructed from another relatively tough material, such as glass fiber, carbon fiber, or engineered plastic. Alternatively, the insert member 34 may be a composite structure constructed, for example, from glass fiber or carbon fiber reinforcement encapsulated in a binding resin matrix including one or more of nylon, epoxy, vinyl ester, etc.

With continued reference to FIG. 5, the insert member 34 includes at least one projection 36. Each projection 36 is configured to match up with and extend at least partially through an individual aperture 32. Accordingly, the projection(s) 36 may be pre-arranged or pre-fit within the respective apertures 32. The side 26-1 including the aperture(s) 32 may be either the side facing the exterior body panel(s) 16 or the side facing the longitudinal vehicle centerline, with the insert member 34 positioned accordingly to match up with the subject aperture(s) 32. As additionally shown in FIG. 5, the insert member 34 may also include an adhesive backing 38. The adhesive backing 38 is configured to adhere the insert member 34 to the rocker rail 26 within the interior space 28. Accordingly, the adhesive backing 38 may maintain the projection(s) 36 in a fixed position relative to the respective aperture(s) 32 in the complete rocker assembly 24.

As shown in FIG. 5, each projection 36 includes a contour 36A configured to reinforce the rocker rail 26 by opposing deformation of the boxed cross-section 26A. The contour 36A opposes deformation of the boxed cross-section 26A via progressively increasing interference and friction with the boxed cross-section at the respective aperture 32 when the rocker rail is subjected to a load or force F that is directed perpendicular to the rocker rail outer surface 30, e.g., an applied side load. The contour 36A of the projection(s) 36 may have a gradually increasing cross-section. In other words, as defined by the contour 36A, the thickness of the projection 36 is greatest at the base of the insert member 34, near the side 26-2, and smallest where the projection is closest to the respective aperture 32. For example, as shown in FIG. 5, the contour 36A may have a conical shape in a plane P perpendicular to the rocker rail face 30, i.e., when viewed from the rocker rail face into the rocker rail interior space 28. Such a contour 36A may specifically oppose deformation of the boxed cross-section 26A via the subject contour progressively increasing interference with the boxed cross-section at the respective aperture 32 when the rocker rail 26 is subjected to the force F.

Figure 3:
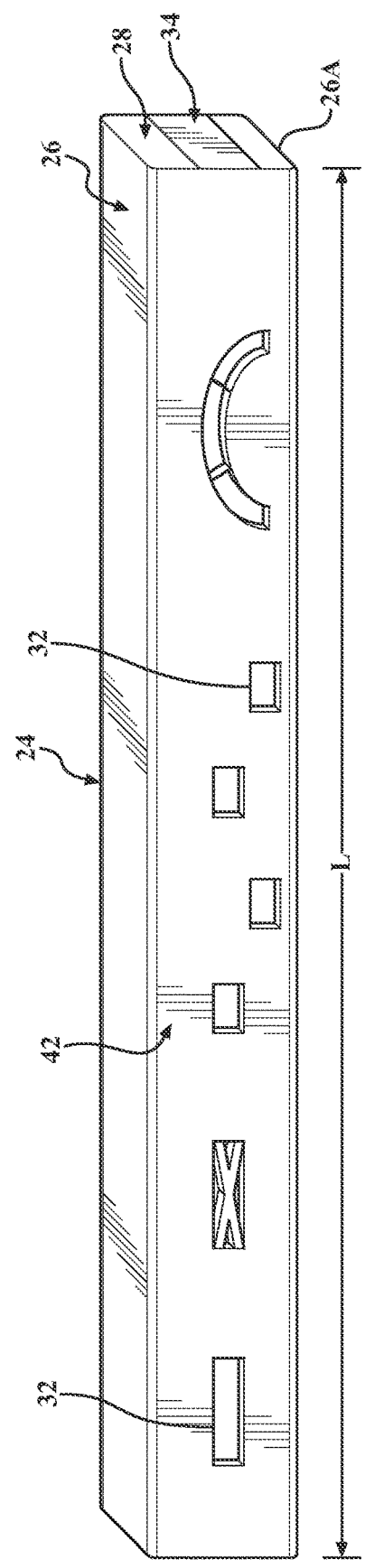
FIG. 3 is a schematic close-up perspective view of the rocker assembly shown in FIG. 1, illustrating another embodiment of the rocker assembly, according to the disclosure.

In one embodiment of the rocker rail 26 having a plurality of apertures 32, the subject apertures may have a same or similar shape (shown in FIG. 2). Alternatively, at least two of the subject apertures 32 may have dissimilar shapes (shown in FIG. 3). In other words, for example, at least one aperture may be square, while another may be rectangular, a third may be an arch, or some other combination of dissimilar shapes. Also, in one embodiment of the rocker rail 26 having a plurality of apertures 32, the subject apertures may be arranged in a straight line 40 across the rocker rail length L (shown in FIG. 2). In yet another embodiment of the rocker rail 26 having a plurality of apertures 32, the subject apertures may be arranged in a staggered pattern 42 across the rocker rail length L (shown in FIG. 3). For example, the apertures 32 may have rectangular shapes arranged in such a straight line 40, as shown in FIG. 2, or arcuate, along with rectangular and square shaped apertures arranged in a staggered pattern 42, as shown in FIG. 3.

The rocker rail 26 may include a first C-channel 44 (shown in FIG. 5) arranged along the rocker rail length L within the rocker rail interior space 28 and against the boxed cross-section wall 26-2 arranged opposite wall 26-1 defining the aperture(s) 32. As particularly shown in FIG. 5, the first C-channel 44 may be configured as a double-sided guide rail for directing the insert member 34 via a plate section 35 during the insert member's installation within the rocker rail 26, and subsequently maintaining the insert member within the rocker rail interior space 28. As shown in FIG. 5, the rocker assembly 24 may also include a metal plate 46 configured to extend within the rocker rail interior space 28 along the rocker rail length L. The metal plate 46 may be further configured to support and position the insert member(s) 34 within the rocker rail interior space 28.

As additionally shown in FIG. 5, the rocker rail 26 may further include a second C-channel 48. The second C-channel 48 is arranged along the rocker rail length L within the rocker rail interior space 28 and between the boxed cross-section wall 26-2 and the wall 26-1 with the aperture(s) 32. The second C-channel 48 is configured to hold the metal plate 46 inside the rocker rail 26. As shown, and similar to the first C-channel 44, the second channel 48 may be defined by a double-sided guide rail, which is configured to position the metal plate 46 and maintain within the rocker rail 26 within the rocker rail interior space 28. The metal plate 46 arranged in the second channel 48 may be particularly effective in positioning and appropriately spacing individual insert members 34 along the rocker rail length L, such as via apertures 46A. Accordingly, in such an embodiment, the metal plate 46 may be configured to align each individual insert member 34 with a respective aperture 32 via a specific aperture 46A.

Overall, the rocker assembly 24 including the rocker rail 26 and the insert member 34 may be employed to generate a high-strength section of the vehicle body structure 12 specifically proximate the door opening 20. The resultant vehicle body structure 12 may be used to establish a robust foundation for a passenger vehicle, such as the vehicle 10, i.e., a more rigid and deformation resistant platform for the vehicle's powertrain, passengers, and cargo. The resultant robust portion vehicle body structure 12 may be additionally used to shield and protect various components, such as, for example, battery pack(s) in an electric or hybrid electric embodiment of the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A rocker assembly for a vehicle body structure, the rocker assembly comprising:
   a rocker rail having a boxed cross-section defining a rocker rail interior space, a rocker rail length, and a rocker rail outer surface along the rocker rail length, and defining at least one aperture connecting the interior space and the rocker rail outer surface; and
   an insert member configured to fit within the rocker rail interior space and extend along the rocker rail length to reinforce the rocker rail;
   wherein the insert member includes at least one projection configured to match up with and extend at least partially through a respective at least one aperture;
   wherein the at least one projection includes a contour configured to reinforce the rocker rail by opposing deformation of the boxed cross-section via interference with the boxed cross-section at the respective at least one aperture when the rocker rail is subjected to an applied load perpendicular to the rocker rail outer surface;
   wherein the rocker rail includes a first C-channel arranged along the rocker rail length within the rocker rail interior space and against a boxed cross-section wall arranged opposite the at least one aperture; and
   wherein the first C-channel is configured to hold the insert member within the rocker rail interior space.

2. The rocker assembly of claim 1, wherein the at least one aperture includes a plurality of apertures, and wherein at least two of the plurality of apertures have dissimilar shapes.

3. The rocker assembly of claim 1, wherein the at least one aperture includes a plurality of apertures, and wherein the plurality of apertures is arranged in a straight line across the rocker rail length.

4. The rocker assembly of claim 1, wherein the at least one aperture includes a plurality of apertures, and wherein the plurality of apertures is arranged in a staggered pattern across the rocker rail length.

5. The rocker assembly of claim 1, wherein the insert member includes an adhesive backing configured to adhere the insert member to the rocker rail within the interior space.

6. The rocker assembly of claim 1, wherein the contour of the at least one projection has a gradually increasing cross-section viewed from the rocker rail outer surface into the rocker rail interior space to thereby oppose deformation of the boxed cross-section via progressively increasing interference with the boxed cross-section at the respective at least one aperture when the rocker rail is subjected to the applied load.

7. The rocker assembly of claim 1, further comprising a metal plate configured to extend within the rocker rail interior space along the rocker rail length and support the insert member within the rocker rail interior space, wherein the rocker rail includes a second C-channel arranged along the rocker rail length within the rocker rail interior space and between the boxed cross-section wall arranged opposite the at least one aperture and the at least one aperture, and wherein the second C-channel is configured to hold the metal plate.

8. The rocker assembly of claim 1, wherein the insert member is constructed from a polymer material.

9. The rocker assembly of claim 1, wherein the insert member is constructed from a composite material.

10. A vehicle body structure comprising:
a body panel defining a door opening;
a frame rail; and
a rocker assembly arranged proximate the door opening and structurally connected with the frame rail, the rocker assembly including:
a rocker rail having a boxed cross-section defining a rocker rail interior space, a rocker rail length, and a rocker rail outer surface along the rocker rail length, and defining at least one aperture connecting the interior space and the rocker rail outer surface; and
an insert member configured to fit within the rocker rail interior space and extend along the rocker rail length to reinforce the rocker rail;
wherein the insert member includes at least one projection configured to match up with and extend at least partially through a respective at least one aperture;
wherein the at least one projection includes a contour configured to reinforce the rocker rail by opposing deformation of the boxed cross-section via interference with the boxed cross-section at the respective at least one aperture when the rocker rail is subjected to an applied load perpendicular to the rocker rail outer surface;
wherein the rocker rail includes a first C-channel arranged along the rocker rail length within the rocker rail interior space and against a boxed cross-section wall arranged opposite the at least one aperture; and
wherein the first C-channel is configured to hold the insert member within the rocker rail interior space.

11. The vehicle body structure of claim 10, wherein the at least one aperture includes a plurality of apertures, and wherein at least two of the plurality of apertures have dissimilar shapes.

12. The vehicle body structure of claim 10, wherein the at least one aperture includes a plurality of apertures, and wherein the plurality of apertures is arranged in a straight line across the rocker rail length.

13. The vehicle body structure of claim 10, wherein the at least one aperture includes a plurality of apertures, and wherein the plurality of apertures is arranged in a staggered pattern across the rocker rail length.

14. The vehicle body structure of claim 10, wherein the insert member includes an adhesive backing configured to adhere the insert member to the rocker rail within the interior space.

15. The vehicle body structure of claim 10, wherein the contour of the at least one projection has a gradually increasing cross-section viewed from the rocker rail outer surface into the rocker rail interior space to thereby oppose deformation of the boxed cross-section via progressively increasing interference with the boxed cross-section at the respective at least one aperture when the rocker rail is subjected to the applied load.

16. The vehicle body structure of claim 10, further comprising a metal plate configured to extend within the rocker rail interior space along the rocker rail length and support the insert member within the rocker rail interior space, wherein the rocker rail includes a second C-channel arranged along the rocker rail length within the rocker rail interior space and between the boxed cross-section wall arranged opposite the at least one aperture and the at least one aperture, and wherein the second C-channel is configured to hold the metal plate.

17. The vehicle body structure of claim 10, wherein the insert member is constructed from a polymer material.

18. The vehicle body structure of claim 10, wherein the insert member is constructed from a composite material.

* * * * *